United States Patent
Gramlich et al.

(10) Patent No.: US 10,889,689 B2
(45) Date of Patent: Jan. 12, 2021

(54) DESALINATION OF POLYARYL ETHERS BY MEANS OF MELT EXTRACTION

(71) Applicant: BASF SE, Ludwigshafen am Rhein (DE)

(72) Inventors: Simon Gramlich, Ludwigshafen am Rhein (DE); Achim Stammer, Ludwigshafen am Rhein (DE); Angela Ulzhoefer, Ludwigshafen am Rhein (DE); Frank Niedermaier, Ladenburg (DE); Michel Gassmann, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 16/086,671

(22) PCT Filed: Mar. 14, 2017

(86) PCT No.: PCT/EP2017/055992
§ 371 (c)(1),
(2) Date: Sep. 20, 2018

(87) PCT Pub. No.: WO2017/162485
PCT Pub. Date: Sep. 28, 2017

(65) Prior Publication Data
US 2019/0085134 A1    Mar. 21, 2019

(30) Foreign Application Priority Data

Mar. 21, 2016 (EP) .................................. 16161430

(51) Int. Cl.
| C08G 65/46 | (2006.01) |
| C08G 75/23 | (2006.01) |
| C08G 75/02 | (2016.01) |
| C08G 65/40 | (2006.01) |
| C08G 75/20 | (2016.01) |
| C08G 75/00 | (2006.01) |
| C08J 5/18 | (2006.01) |
| C08J 3/14 | (2006.01) |

(52) U.S. Cl.
CPC ............. *C08G 75/23* (2013.01); *C08G 65/40* (2013.01); *C08G 65/46* (2013.01); *C08G 75/00* (2013.01); *C08G 75/02* (2013.01); *C08G 75/20* (2013.01); *C08J 3/14* (2013.01); *C08J 5/18* (2013.01); *C08J 2381/06* (2013.01)

(58) Field of Classification Search
CPC ........ C08G 75/00; C08G 75/02; C08G 75/23; C08G 65/40; C08G 65/46; C08J 3/14; C08J 5/18
See application file for complete search history.

(56) References Cited

U.S. PATENT DOCUMENTS

| 4,113,698 A | 9/1978 | Staniland |
| 4,200,727 A | 4/1980 | Blinne et al. |
| 4,200,728 A | 4/1980 | Blinne et al. |
| 5,013,816 A | 5/1991 | Bobbink et al. |
| 9,102,798 B2 * | 8/2015 | Weber ..................... C08G 75/23 |
| 9,975,994 B2 * | 5/2018 | Gramlich ............... C08G 65/46 |
| 9,994,678 B2 | 6/2018 | Schmidt et al. |
| 2017/0081472 A1 | 3/2017 | Zhu et al. |
| 2018/0009950 A1 | 1/2018 | Gramlich et al. |

FOREIGN PATENT DOCUMENTS

| CN | 102786681 A | 11/2012 |
| DE | 1957091 A1 | 6/1970 |
| DE | 2749645 A1 | 5/1979 |
| DE | 3644464 A1 | 7/1988 |
| EP | 000361 A1 | 1/1979 |
| EP | 0292211 A2 | 11/1988 |
| EP | 2305740 A1 | 4/2011 |
| GB | 1264900 A | 2/1972 |
| GB | 2376019 A | 12/2002 |
| WO | WO-2010046482 A1 | 4/2010 |
| WO | WO-2011020823 A1 | 2/2011 |
| WO | WO-2014033321 A1 | 3/2014 |
| WO | WO-2017140773 A1 | 8/2017 |
| WO | WO-2017140779 A1 | 8/2017 |
| WO | WO-2017140795 A1 | 8/2017 |

OTHER PUBLICATIONS

U.S. Appl. No. 15/545,546, filed 2018.*
U.S. Appl. No. 16/062,752, filed Jun. 15, 2018.
European Search Report for European Application No. 16161430.0, dated Jul. 14, 2016.
International Preliminary Examination Report for PCT/EP2017/055992 dated Jun. 19, 2018, with Applicant amendments (in German).
International Search Report for PCT/EP2017/055992 dated Apr. 11, 2017.
Written Opinion of the International Searching Authority for PCT/EP2017/055992 dated Apr. 11, 2017.

* cited by examiner

*Primary Examiner* — Edward J Cain
(74) *Attorney, Agent, or Firm* — Faegre Drinker Biddle & Reath LLP

(57) ABSTRACT

The present invention relates to a process for preparing a polyaryl ether by reacting components (a1) and (a2) in the presence of a carbonate compound (C) to obtain a salt-containing polymer (SP) comprising the polyaryl ether and a salt (S). After the reaction, the salt (S) is extracted from the salt-containing polymer (SP) to obtain a desalinated polymer (DP) comprising the polyaryl ether.

16 Claims, No Drawings

DESALINATION OF POLYARYL ETHERS BY MEANS OF MELT EXTRACTION

CROSS-REFERENCE TO RELATED APPLICATIONS

This application is a national stage application (under 35 U.S.C. § 371) of PCT/EP2017/055992, filed Mar. 14, 2017, which claims benefit of European Application No. 16161430.0, filed Mar. 21, 2016, both of which are incorporated herein by reference in their entirety.

The present invention relates to a process for preparing a polyaryl ether by reacting components (a1) and (a2) in the presence of a carbonate compound (C) to obtain a salt-containing polymer (SP) comprising the polyaryl ether and a salt (S). After the reaction, the salt (S) is extracted from the salt-containing polymer (SP) to obtain a desalinated polymer (DP) comprising the polyaryl ether.

A group of polyaryl ether polymers of particular economic significance is that of the polyaryl ether sulfones. Polyaryl ether polymers are part of the group of the high-performance thermoplastics and are notable for high heat distortion resistance combined with good mechanical properties and inherent flame retardancy.

The preparation of polyaryl ether polymers has long been known. The preparation of polyaryl ether polymers is generally effected by polycondensation of corresponding aromatic dihydroxyl compounds with aromatic dihalogen compounds, the polycondensation being conducted in an aprotic polar solvent in the presence of potassium carbonate as base. The polyaryl ether polymers are obtained in the production process in the form of a solution comprising the polyaryl ether polymers dissolved in the aprotic polar solvent. The potassium halide formed during the reaction can be separated from the solution by mechanical means, for example by centrifugation or filtration, such that the solution and hence also the subsequently isolated polyaryl ether polymers comprise only a small amount of or even no potassium halide. For subsequent isolation of the polyaryl ether polymers from the aprotic polar solvent, various methods are described in the prior art.

According to the processes described in DE 19 57 091 and EP 0 000 361 for isolation of polyaryl ether polymers which are prepared by polycondensation in an aprotic polar solvent, the solution comprising the polyaryl ether polymers dissolved in an aprotic polar solvent is introduced into water and the polyaryl ether polymers are precipitated thereby.

DE 36 44 464 and EP 2 305 740 likewise describe processes for preparing polyaryl ether polymers by polycondensation in an aprotic polar solvent. The solution obtained, comprising the polyaryl ether polymers dissolved in the aprotic polar solvent, is subsequently dropletized in a precipitation bath comprising water, and the polyaryl ether polymers are thus obtained in the form of beads.

EP 0 292 211 describes a process for preparing aryl polyethers or thioethers, wherein a bisphenol, a bisthiophenol or a hydroxyphenyl mercaptan is contacted with a dihalobenzoid compound in the presence of a basic alkali metal catalyst, and wherein the reaction is effected in the presence of a solvent. The product solution obtained is contacted with water, and hence the alkali metal halide that forms in the reaction is removed.

U.S. Pat. No. 4,113,698 describes a process for preparing polyetherketones by nucleophilic polycondensation of an alkali metal bisphenoxide with at least one dihalo compound and/or an alkali metal halophenate in an aromatic solvent. The reaction mixture obtained is subsequently crystallized or precipitated and finally brought to a small particle size by grinding and washed with water.

WO 2010/046482 describes a process for preparing polyetherketones in diphenyl sulfone to obtain a reaction mixture, which is then cooled down such that it solidifies. The solid reaction mixture is then ground and extracted with acetone and water.

What is common to all the processes described in the prior art in which polyaryl ether polymers are prepared by polycondensation in an aprotic polar solvent is that they have only a low content of potassium halide. However, it is not possible to completely remove the aprotic polar solvent from the polyaryl ether polymers. These aprotic polar solvents are consequently also present in moldings which are produced from the polyaryl ether polymers obtainable by the processes described above.

The aprotic polar solvents can migrate out of these moldings in the course of use thereof. The moldings thus obtained are therefore a matter of toxicological concern. The moldings are consequently frequently unsuitable for food applications in particular.

In order to avoid any residual content of aprotic polar solvent in the polyaryl ether polymers, the prior art describes melt polymerization processes for preparing polyaryl ether polymers.

DE 27 49 645 describes a process for preparing polyaryl ethers in a melt polymerization process by polycondensation of at least one bisphenol with at least one dihalobenzene compound or of a halophenol in the presence of anhydrous alkali metal carbonate in the absence of solvents or diluents. The reaction is conducted in a kneader or in an extruder. The inorganic constituents which are formed during the condensation reaction, for example sodium chloride or potassium chloride, are removed from the polyaryl ethers by dissolution and subsequent filtration, sieving or extraction.

WO 2014/033321 likewise describes a process for preparing aromatic polyaryl ethers in a melt polymerization process by reacting a dichlorodiphenyl sulfone component with a bisphenol component in the presence of an alkali metal carbonate in the absence of solvents or diluents, the reaction being conducted in a mixing kneader. The polyaryl ether polymers thus obtained are ground to a particle size of about 2 mm and washed twice with water at 80° C. for 3 hours in order to remove the alkali metal chloride formed as a by-product. However, the process described in WO 2014/033321 can remove only 80% of the alkali metal chloride from the polyaryl ether.

The polyaryl ether polymers prepared by melt polymerization do not have any residual content of aprotic polar solvent.

GB 2 376 019 describes a process for purifying polyketones. This involves contacting the polyketones with water and extractant. During the contacting, the polyketone is in the form of powders, pellets or granules.

CN 102 786 681 describes a process for purifying polymers, preferably polyetherketones. The polymer is used in solid form as a powder, in particulate form or in circular form. Subsequently, it is contacted with water as extractant.

It is thus an object of the present invention to provide an improved process for desalinating a salt-containing polymer (SP) comprising a polyaryl ether and a salt (S). The desalinated polymer (DP) thus prepared should have a low or zero residual content of aprotic polar solvents and a reduced residual content of salt (S) compared to the polyaryl ether polymers obtainable by the prior art processes. The process of the invention and the desalinated polymers (DP) obtainable thereby are to have the disadvantages of the processes described in the prior art and of the polymers obtainable therefrom only to a reduced degree, if at all. The process of the invention is to be simple, have a minimum susceptibility to faults and be performable inexpensively.

It is therefore an object of the present invention to provide a process for preparing a polyaryl ether. The polyaryl ether thus prepared is to have the disadvantages of the polyaryl ethers as described in the prior art only to a reduced degree, if at all. The process of the invention is to be simple, have a minimum susceptibility to faults and be performable inexpensively.

This object is achieved in accordance with the invention by a process for preparing a polyaryl ether having a softening temperature $T_S$, comprising the steps of I) reacting the components
   (a1) at least one aromatic dihydroxyl compound and
   (a2) at least one aromatic sulfone compound having two halogen substituents
   in the presence of a carbonate compound (C) at a first temperature $T_{1-I}$ above the softening temperature $T_S$ of the polyaryl ether in a mixing kneader to obtain a salt-containing polymer (SP) comprising the polyaryl ether and a salt (S), II) transferring the salt-containing polymer (SP) obtained in step I) from the mixing kneader into a reactor comprising a dynamic mixer, where the salt-containing polymer (SP) has a second temperature $T_{2-II}$ above the softening temperature $T_S$ of the polyaryl ether, and where the reactor comprises an extractant (C) having a third temperature $T_{3-II}$ above the softening temperature $T_S$ of the polyaryl ether, III) extracting the salt (S) from the salt-containing polymer (SP) with the extractant (E) in the reactor comprising a dynamic mixer at a fourth temperature $T_{4-III}$ above the softening temperature $T_S$ of the polyaryl ether to obtain a desalinated polymer (DP) comprising the polyaryl ether and a salt-containing extractant (SE) comprising the extractant (E) and the salt (S).

It has been found that, surprisingly, the process of the invention, compared to the processes described in the prior art, can remove more salt (S) from the salt-containing polymer (SP) within the same period of time. This means that the salt (S) can be removed more quickly from the salt-containing polymer (SP). Surprisingly, the process of the invention can achieve a salt content of not more than 150 ppm by weight in the desalinated polymer (DP). This distinctly increases the storage stability of the desalinated polymer (DP) compared to the polyaryl ethers from the prior art which have been prepared by a melt polymerization process. The desalinated polymer (DP) additionally has good melt stability. In the course of remelting, there is thus neither degradation of the polyaryl ether nor progression of the polymerization of the polyaryl ether.

The desalinated polymer (DP) can additionally be used for production of membranes.

The process of the invention is also especially suitable for the desalination of salt-containing polymers (SP) which have been prepared by a melt polymerization process. If salt-containing polymers (SP) prepared by melt polymerization processes are used in the process of the invention, the desalinated polymers (DP) do not have any residual solvent content. Thus, the desalinated polymers (DP) thus obtainable are also usable for the production of moldings suitable for food applications.

The process of the invention is elucidated in detail hereinafter.

Process for Preparing a Polyaryl Ether

Step I)

In the process for preparing a polyaryl ether, in accordance with the invention, in step I), components (a1) and (a2) are converted in the presence of a carbonate compound (C) at a first temperature above the softening temperature $T_S$ of the polyaryl ether in a mixing kneader. This affords a salt-containing polymer (SP). The salt-containing polymer (SP) comprises the polyaryl ether and a salt (S). Component (a1) is at least one aromatic hydroxyl compound. Component (a2) is at least one aromatic sulfone compound having two halogen substituents.

"A carbonate compound (C)" in the context of the present invention means either exactly one carbonate compound (C) or a mixture of two or more carbonate compounds (C).

Components (a1) and (a2) can be reacted in the presence of the carbonate compound (C) by any methods known to those skilled in the art. The reaction can be effected in the presence of at least one solvent and/or diluent. Reaction in the absence of a solvent and/or diluent is likewise possible. Preference is given to reaction in the absence of a solvent and/or diluent.

The present invention therefore also provides a process in which components (a1) and (a2) are reacted in step I) in the presence of a carbonate compound (C) in the absence of a solvent and/or diluent.

Suitable solvents and/or diluents for the reaction of components (a1) and (a2) in the presence of a carbonate compound (C) are known as such to those skilled in the art and are typically aprotic polar solvents. Aprotic polar solvents of this kind are selected, for example, from the group consisting of N,N-dimethylformamide, N,N-dimethylacetamide, N-methylpyrrolidone, N-ethylpyrrolidone, dimethyl sulfoxide, dimethyl sulfone, sulfolane, diphenyl sulfone and mixtures thereof. It is therefore also preferable in accordance with the invention that the reaction of components (a1) and (a2) in step I) in the presence of the carbonate compound-(C) is effected in the absence of an aprotic polar solvent selected from the group consisting of N,N-dimethylformamide, N,N-dimethylacetamide, N-methylpyrrolidone, N-ethylpyrrolidone, dimethyl sulfoxide, dimethyl sulfone, sulfolane, diphenyl sulfone and mixtures thereof; especially preferably, the reaction of components (a1) and (a2) in step I) is effected in the presence of a carbonate compound (C) in the absence of an aprotic polar solvent.

The present invention therefore also provides a process in which the reaction of components (a1) and (a2) in step I) is effected in the absence of an aprotic polar solvent selected from the group consisting of N,N-dimethylformamide, N,N-dimethylacetamide, N-methylpyrrolidone, N-ethylpyrrolidone, dimethyl sulfoxide, dimethyl sulfone, sulfolane, diphenyl sulfone and mixtures thereof.

As described above, the reaction of components (a1) and (a2) in the presence of the carbonate compound (C) in step I) is preferably effected in the absence of a solvent and/or diluent. It is particularly preferable that the reaction is effected in a melt polymerization process. Melt polymerization processes for preparation of polyaryl ethers are described, for example, in DE 2 749 645 and in WO 2014/033321.

The present invention thus also provides a process in which components (a1) and (a2) are reacted in step I) in the presence of a carbonate compound (C) by a melt polymerization process.

In a melt polymerization process, components (a1) and (a2) are typically reacted with one another in molten form to obtain the salt-containing polymer (SP) which is likewise in molten form.

When components (a1) and (a2) are in molten form, this means that they are above their melting point.

If the salt-containing polymer (SP) is in molten form, this means that the salt-containing polymer (SP) is at a temperature above the melting temperature of the polyaryl ether present when the polyaryl ether is semicrystalline. Preferably in accordance with the invention, the polyaryl ether is amorphous. "The salt-containing polymer (SP) is in molten form" in that case means that the salt-containing polymer (SP) is above the softening temperature $T_S$, preferably above the glass transition temperature $T_G$, of the polyaryl ether present. The details and preferences described further down are applicable to the softening temperature $T_S$ and the glass transition temperature $T_G$ of the polyaryl ether.

According to the invention, components (a1) and (a2) are therefore reacted at a first temperature $T_{1-I}$ above the softening temperature $T_S$, preferably above the glass transition temperature $T_G$, of the polyaryl ether.

The present invention therefore also provides a process in which step I) is conducted at a first temperature $T_{1-I}$ above the glass transition temperature $T_G$ of the polyaryl ether.

The details and preferences described further down are applicable to the softening temperature $T_S$ of the polyaryl ether and the glass transition temperature $T_G$ of the polyaryl ether.

The first temperature $T_{1-I}$ at which components (a1) and (a2) are reacted in step I) is, for example, in the range from 200 to 400° C., preferably in the range from 250 to 350° C.

The present invention therefore also provides a process in which the first temperature $T_{1-I}$ in step I) is in the range from 200 to 400° C.

It will be apparent that the first temperature $T_{1-I}$ at which components (a1) and (a2) are reacted in step I) is typically below the decomposition temperature of the polyaryl ether. Preferably, the first temperature $T_{1-I}$ is at least 1° C., preferably at least 5° C. and especially preferably at least 10° C. below the decomposition temperature of the polyaryl ether.

In step I), component (a1) and component (a2) are preferably reacted in a molar ratio to one another in the range from 0.9 to 1.4, more preferably in the range from 1.0 to 1.2 and especially preferably in the range from 1.0 to 1.1.

The present invention therefore also provides a process in which the molar ratio of component (a1) to component (a2) in the reaction in step I) is in the range from 0.9 to 1.4.

The carbonate compound (C) is present in step I) preferably in a molar ratio to component (a1) of 0.9 to 1.22, more preferably of 1.0 to 1.12 and especially preferably of 1.03 to 1.10.

The present invention therefore also provides a process in which the molar ratio of the carbonate compound (C) to component (a1) in step I) is in the range from 0.9 to 1.22.

It will be apparent that the molar ratio of component (a1) to component (a2), just like the molar ratio of the carbonate compound (C) to component (a1), relates to the molar ratio on commencement of the reaction in step I), i.e. before components (a1) and (a2) and the carbonate compound (C) have reacted with one another in step I).

According to the invention, components (a1) and (a2) are reacted in a mixing kneader. Suitable mixing kneaders are known as such to those skilled in the art. Preference is given to single- or twin-shaft kneaders, particular preference to twin-shaft kneaders. It is also preferable that the mixing kneader additionally comprises a reflux condenser in order to recycle volatile monomer which may have evaporated at the reaction temperatures into the mixing kneader.

For conversion of components (a1) and (a2) in step I), for example, components (a1) and (a2) are initially charged in the mixing kneader and then the carbonate compound (C) is fed in.

It is preferable that components (a1) and (a2) are fed to the mixing kneader in solid form and then first melted therein, and then the carbonate compound (C) is fed in.

It is additionally possible to initially charge the carbonate compound (C) with one of the two components (a1) and (a2) and then to add the second of the two components (a1) and (a2).

It is preferable to initially charge the carbonate compound (C) with component (a1). In general, in that case, component (a1) is first reacted with the carbonate compound (C) to form a dialkoxide. Subsequently, component (a2) is added.

According to the invention, it is particularly preferable to premix components (a1) and (a2) and the carbonate compound (C) each in the form of a powder and then to feed this mixture to the mixing kneader. In the mixing kneader, the mixture is then melted and components (a1) and (a2) are reacted.

Components (a1) and (a2) can be introduced into the mixing kneader in liquid or solid form. They are preferably introduced into the mixing kneader in solid form. If components (a1) and/or (a2) are introduced into the mixing kneader in solid form, they can be introduced into the mixing kneader, for example, in the form of powder or granules.

Components (a1) and (a2) can be reacted in the mixing kneader over any period of time. The reaction time of components (a1) and (a2) in the mixing kneader is preferably in the range from 0.5 to 3.5 hours, more preferably in the range from 1.5 to 3 hours.

The reaction of components (a1) and (a2) in the presence of the carbonate compound (C) is a condensation reaction. Condensation reactions of this kind are known per se to the person skilled in the art.

The reaction of component (a1) and component (a2) in the presence of the carbonate compound (C) in step I) typically forms not only the polyaryl ether but also water, carbon dioxide and the salt (S).

The water formed and the carbon dioxide formed can be removed from the mixing kneader as gaseous constituents during the reaction. The salt (S) generally remains in the polyaryl ether, and so the reaction of components (a1) and (a2) affords the salt-containing polymer (SP).

The details and preferences described further down are applicable to the salt-containing polymer (SP) and the salt (S).

Component (a1)

According to the invention, component (a1) is at least one aromatic dihydroxyl compound. For example, component (a1) is selected from the group consisting of
4,4'-dihydroxybiphenyl;
dihydroxybenzenes, especially hydroquinone and resorcinol;
dihydroxynaphthalenes, especially 1,5-dihydroxynaphthalene, 1,6-dihydroxynaphthalene, 1,7-dihydroxynaphthalene and 2,7-dihydroxynaphthalene;
other dihydroxybiphenyls than 4,4'-biphenol, especially 2,2'-biphenol;
bisphenyl ethers, especially bis(4-hydroxyphenyl) ether and bis(2-hydroxyphenyl) ether;

bisphenylpropanes, especially 2,2-bis(4-hydroxyphenyl) propane, 2,2-bis(3-methyl-4-hydroxyphenyl)propane and 2,2-bis(3,5-dimethyl-4-hydroxyphenyl)propane;
bisphenylmethanes, especially bis(4-hydroxyphenyl)methane;
bisphenylcyclohexanes, especially bis(4-hydroxyphenyl)-2, 2,4-trimethylcyclohexane;
bisphenyl sulfones, especially bis(4-hydroxyphenyl) sulfone;
bisphenyl sulfides, especially bis(4-hydroxyphenyl) sulfide;
bisphenyl ketones, especially bis(4-hydroxyphenyl) ketone;
bisphenylhexafluoropropanes, especially 2,2-bis(3,5-dimethyl-4-hydroxyphenyl)hexafluoropropane; and
bisphenylfluorenes, especially 9,9-bis(4-hydroxyphenyl) fluorene.

Preferably, component (a1) comprises at least 50% by weight, more preferably at least 60% by weight, particularly preferably at least 80% by weight and especially at least 95% by weight of at least one dihydroxyl component selected from the group consisting of 4,4'-dihydroxybiphenyl, 2,2-bis(4-hydroxyphenyl)propane and bis(4-hydroxyphenyl) sulfone, based in each case on the total weight of component (a1). Most preferably, component (a1) consists of at least one dihydroxyl component selected from the group consisting of 4,4'-dihydroxybiphenyl, 2,2-bis(4-hydroxyphenyl)propane and bis(4-hydroxyphenyl) sulfone.

2,2-Bis(4-hydroxyphenyl)propane is also known by the name bisphenol A. Bis(4-hydroxyphenyl) sulfone is also known by the name bisphenol S.

The present invention therefore also provides a process in which component (a1) is selected from the group consisting of 4,4'-dihydroxybiphenyl, 2,2-bis(4-hydroxyphenyl)propane and bis(4-hydroxyphenyl) sulfone.

Component (a2)

According to the invention, component (a2) is at least one aromatic sulfone compound having two halogen substituents.

Components (a2) of this kind are known per se to the person skilled in the art. Preferably, component (a2) is a dihalodiphenyl sulfone. It is therefore preferable that component (a2) is selected from the group consisting of 4,4'-dichlorodiphenyl sulfone, 4,4'-difluorodiphenyl sulfone, 4,4'-dibromodiphenyl sulfone, 2,2'-dichlorodiphenyl sulfone and 2,2'-difluorodiphenyl sulfone; component (a2) is more preferably selected from the group consisting of 4,4'-dichlorodiphenyl sulfone and 4,4'-difluorodiphenyl sulfone; most preferably, component (a2) is 4,4'-dichlorodiphenyl sulfone.

The present invention therefore also provides a process in which component (a2) is selected from the group consisting of 4,4'-dichlorodiphenyl sulfone, 4,4'-difluorodiphenyl sulfone, 4,4'-dibromodiphenyl sulfone, 2,2'-dichlorodiphenyl sulfone and 2,2'-difluorodiphenyl sulfone.

Carbonate Compound (C)

Suitable carbonate compounds (C) are known as such to those skilled in the art. Preferably, the carbonate compound (C) is an alkali metal carbonate and/or an alkaline earth metal carbonate. Preferably, the carbonate compound (C) is anhydrous.

Preferably, the carbonate compound (C) is therefore an anhydrous alkali metal carbonate, preference being given to anhydrous sodium carbonate, anhydrous potassium carbonate and mixtures thereof; an especially preferred carbonate compound (C) is anhydrous potassium carbonate.

Salt-Containing Polymer (SP)

In step I), the salt-containing polymer (SP) is obtained.

The salt-containing polymer (SP) comprises the polyaryl ether and the salt (S).

According to the invention, "a polyaryl ether" is understood to mean exactly one polyaryl ether and likewise mixtures of two or more polyaryl ethers.

In the context of the present invention, "a salt (S)" is understood to mean either exactly one salt (S) or mixtures of two or more salts (S).

For example, the salt-containing polymer (SP) comprises at least 50% by weight, particularly preferably at least 60% by weight, more preferably at feast 65% by weight and especially preferably at least 70% by weight of the polyaryl ether, based in each case on the total weight of the salt-containing polymer (SP).

It is also preferable that the salt-containing polymer (SP) comprises at most 99.98% by weight, preferably at most 99% by weight, more preferably at most 90% by weight and especially preferably at most 80% by weight of the polyaryl ether, based in each case on the total weight of the salt-containing polymer (SP).

Preferably, the salt-containing polymer (SP) comprises 50% to 99.98% by weight, more preferably 60% to 99% by weight, especially preferably 65% to 90% by weight and most preferably 70% to 80% by weight of the polyaryl ether, based in each case on the total weight of the salt-containing polymer (SP).

The salt-containing polymer (SP) typically comprises at least 0.02% by weight, preferably at least 1% by weight, more preferably at least 10% by weight and especially preferably at least 20% by weight of the salt (S), based in each case on the total weight of the salt-containing polymer (SP).

For example, the salt-containing polymer (SP) comprises at most 50% by weight, preferably at most 40% by weight, more preferably at most 35% by weight and especially preferably at most 30% by weight of the salt (S), based in each case on the total weight of the salt-containing polymer (SP).

It is preferable that the salt-containing polymer (SP) comprises 0.02% to 50% by weight of the salt (S), more preferably 1% to 40% by weight of the salt (S), especially preferably 10% to 35% by weight and most preferably 20% to 30% by weight of the salt (S), based in each case on the total weight of the salt-containing polymer (SP).

It is possible that the salt-containing polymer (SP) additionally comprises additives. Suitable additives are known as such to those skilled in the art. Additives of this kind are typically reacted with components (a1) and (a2) in step I) and/or components (a1) and (a2) are reacted in step I) in the presence of the additives.

If the salt-containing polymer (SP) additionally comprises additives, the salt-containing polymer (SP) generally comprises 0.01% to 10% by weight of additives, preferably 0.01% to 7% by weight of additives and especially preferably 0.01% to 5% by weight of additives, based in each case on the total weight of the salt-containing polymer (SP).

In one embodiment, the salt-containing polymer (SP) does not comprise any additional additives.

In addition, the salt-containing polymer (SP) may comprise the carbonate compound (C). The details and preferences described further down are applicable to the carbonate compound (C). If the salt-containing polymer (SP) comprises the carbonate compound (C), the salt-containing polymer (SP) comprises in the range from 0.01% to 20% by weight, preferably in the range from 0.01% to 5% by weight and especially preferably in the range from 0.01% to 2% by weight of the carbonate compound (C), based on the total weight of the salt-containing polymer (SP). The carbonate compound (C) is different than the salt (S). In one embodiment, the salt-containing polymer (SP) does not comprise any carbonate compounds (C).

Typically, the salt-containing polymer (SP) comprises 50% to 99.98% by weight of the polyaryl ether and 0.02% to 50% by weight of the salt (S), preferably 60% to 99% by weight of the polyaryl ether and 1% to 40% by weight of the salt (S), especially preferably 65% to 90% by weight of the polyaryl ether and 10% to 35% by weight of the salt (S) and most preferably 70% to 80% by weight of the polyaryl ether and 20% to 30% by weight of the salt (S), based in each case on the total weight of the salt-containing polymer (SP).

In general, the sum totals of the percentages by weight of the polyaryl ether, the salt (S) and any additional additives and the carbonate compound (C) add up to 100%.

The viscosity numbers of the salt-containing polymer (SP) are generally in the range from 15 to 90 mL/g, preferably from 22.5 to 75 mL/g and especially preferably from 26.25 to 71.25 mL/g, determined by Ubbelohde viscosity number measurement of a 0.01 g/mL solution of the salt-containing polymer (SP) in a 1:1 phenol/1,2-dichlorobenzene mixture in accordance with DIN 51562.

The viscosity number of the salt-containing polymer (SP) is typically lower than the viscosity number of the desalinated polymer (DP).

Salt (S)

In general, the salt (S) comprises a cation and a halide, preferably a cation and a chloride. A halide is also referred to as "halide anion". A chloride is also referred to as "chloride anion".

According to the invention, "a cation" is understood to mean either exactly one cation or mixtures of two or more cations.

According to the invention, "a halide" is understood to mean either exactly one halide or mixtures of two or more halides.

In general, the salt (S) is an inorganic salt when the carbonate compound (C) used is an inorganic carbonate compound (C). Preferably, the salt (S) is an alkali metal halide when the carbonate compound (C) used is an alkali metal carbonate. Most preferably, the salt (S) is potassium chloride and/or sodium chloride when the carbonate compound (C) used is potassium carbonate and/or sodium carbonate.

The present invention therefore also provides a process in which the salt (S) comprises potassium chloride and/or sodium chloride.

The percentages by weight of the salt (S) in the salt-containing polymer (SP) can therefore be determined via the measurement of the percentages by weight of the halide, preferably of the chloride, in the salt-containing polymer (SP). The percentages by weight of the halide are understood to mean the percentages by weight of the anionic halogen, i.e. the percentages by weight of the free halide and not the percentages by weight of the polymer-bound halogen. The same applies to the percentages by weight of chloride. These relate to the percentages by weight of the ionic chlorine and hence to the percentages by weight of the free chloride and not to the percentages by weight of the polymer-bound chlorine.

To determine the percentages by weight of halide, preferably of chloride, in the salt-containing polymer (SP), 700 mg of the salt-containing polymer (SP) are dissolved in N-methylpyrrolidone (NMP) and the resulting solution is diluted with an acetic acid/acetone mixture (ratio of acetic acid to acetone 1:1). The solution thus obtained is acidified with sulfuric acid or nitric acid and then potentiometrically titrated with a 0.0002 mol/L silver nitrate solution, using methyl orange as indicator. The electrode used is an Ag Titrode from Metrohm.

The percentages by weight of halide can subsequently be used to calculate the percentages by weight of the cation likewise present in the salt (S) in the salt-containing polymer (SP). Methods for this purpose are known to those skilled in the art. The sum total of the percentages by weight of the halide and of the percentages by weight of the cation in the salt-containing polymer then gives the percentages by weight of the salt (S) in the salt-containing polymer (SP).

The percentages by weight of salt (S) in the desalinated polymer (DP) described hereinafter are determined in the same manner in accordance with the invention.

Polyaryl Ether

Polyaryl ethers are known to those skilled in the art as a class of polymer.

Polyaryl ethers preferred in accordance with the invention are formed from units of the general formula (I):

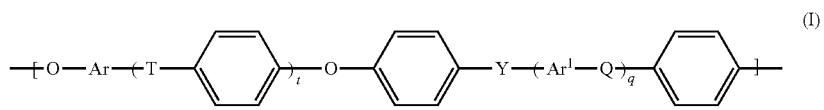

where the symbols t, q, Q, T, Y, Ar and $Ar^1$ are defined as follows:

t, q: each independently 0, 1, 2 or 3,

Q, T, Y: each independently a chemical bond or group selected from —O—, —S—, —SO$_2$—, S=O, C=O, —N=N— and —CR$^a$R$^b$— where R$^a$ and R$^b$ are each independently a hydrogen atom or a $C_1$-$C_{12}$-alkyl, $C_1$-$C_{12}$-alkoxy or $C_6$-$C_{18}$-aryl group, and where at least one of Q, T and Y is —SO$_2$— and Ar, $Ar^1$: each independently an arylene group having from 6 to 18 carbon atoms.

If Q, T or Y, under the abovementioned conditions, is a chemical bond, this is understood to mean that the adjacent group to the left and the adjacent group to the right are joined directly to one another via a chemical bond.

Preferably, however, Q, T and Y in formula (I) are each independently selected from —O— and —SO$_2$—, with the proviso that at least one of the group consisting of Q, T and Y is —SO$_2$—. These polyaryl ethers are polyaryl ether sulfones.

The present invention thus also provides a process in which the polyaryl ether is a polyaryl ether sulfone.

If Q, T or Y is —CR$^a$R$^b$—, R$^a$ and R$^b$ are each independently a hydrogen atom or a $C_1$-$C_{12}$-alkyl, $C_1$-$C_{12}$-alkoxy or $C_6$-$C_{18}$-aryl group.

Preferred $C_1$-$C_{12}$-alkyl groups comprise linear and branched, saturated alkyl groups having from 1 to 12 carbon atoms. Particular mention should be made of the following radicals: $C_1$-$C_6$-alkyl radical such as methyl, ethyl, n-propyl, i-propyl, n-butyl, sec-butyl, 2- or 3-methylpentyl and longer-chain radicals such as unbranched heptyl, octyl, nonyl, decyl, undecyl, lauryl and the singly or multiply branched analogs thereof.

Useful alkyl radicals in the aforementioned usable $C_1$-$C_{12}$-alkoxy groups include the alkyl groups defined further up having from 1 to 12 carbon atoms. Cycloalkyl radicals usable with preference include especially $C_3$-$C_{12}$-cycloalkyl radicals, for example cyclopropyl, cyclobutyl, cyclopentyl, cyclohexyl, cycloheptyl, cyclooctyl, cyclopropylmethyl, cyclopropylethyl, cyclopropylpropyl, cyclobutylmethyl, cyclobutylethyl, cyclopentylethyl, -propyl, -butyl, -pentyl, -hexyl, cyclohexylmethyl, -dimethyl, and -trimethyl.

Ar and $Ar^1$ are each independently a $C_6$-$C_{18}$-arylene group. Proceeding from the starting materials described further up, Ar is preferably derived from an electron-rich aromatic substance subject to easy electrophilic attack, preferably selected from the group consisting of hydroquinone, resorcinol, dihydroxynaphthalene, especially 2,7-dihydroxynaphthalene, and 4,4'-bisphenol. $Ar^1$ is preferably an unsubstituted $C_6$- or $C_{12}$-arylene group.

Useful $C_6$-$C_{18}$-arylene groups Ar and $Ar^1$ include in particular phenylene groups such as 1,2-, 1,3- and 1,4-phenylene, naphthylene groups, for example 1,6-, 1,7-, 2,6- and 2,7-naphthylene, and the arylene groups derived from anthracene, phenanthrene and naphthacene.

Preferably, Ar and $Ar^1$ in the preferred embodiment of formula (I) are each independently selected from the group consisting of 1,4-phenylene, 1,3-phenylene, naphthylene, especially 2,7-dihydroxynaphthylene, and 4,4'-bisphenylene.

Preferred polyaryl ethers are those comprising at least one of the following units Ia to Io as repeat structural units:

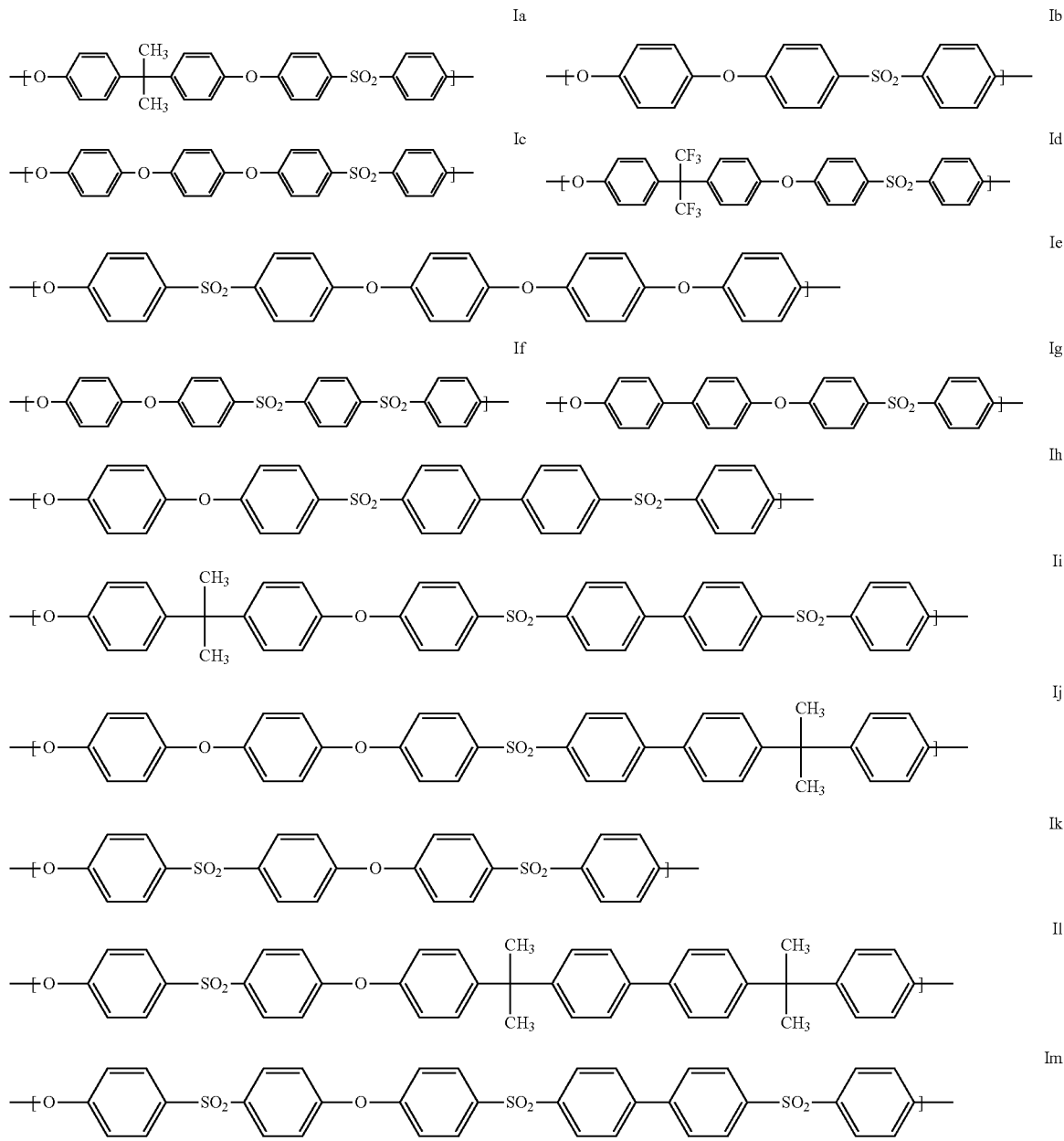

In

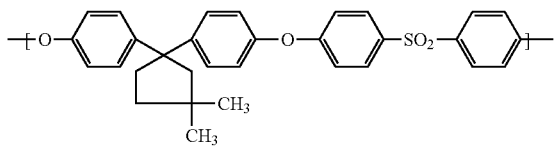

Io

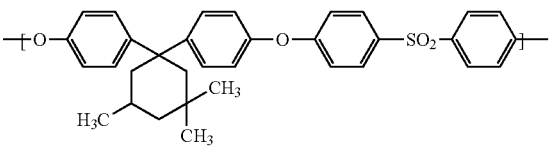

-continued

In addition to the preferred units Ia to Io, preference is also given to those units in which one or more 1,4-phenylene units which originate from hydroquinone are replaced by 1,3-phenylene units which originate from resorcinol or by naphthylene units which originate from dihydroxynaphthalene.

Particularly preferred units of the general formula (I) are the units Ia, Ig and Ik. It is also particularly preferred when the polyaryl ethers are formed essentially from one kind of units of the general formula (I), especially from a unit selected from Ia, Ig and Ik.

In a particularly preferred embodiment, Ar=1,4-phenylene, t=1, q=0, T is a chemical bond and Y=$SO_2$. Particularly preferred polyaryl ether sulfones formed from the aforementioned repeat unit are referred to as polyphenylene sulfone (PPSU) (formula Ig). Polyphenylene sulfone is also referred to as polybiphenylsulfone polymer.

In a further particularly preferred embodiment, Ar=1,4-phenylene, t=1, q=0, T=$C(CH_3)_2$ and Y=$SO_2$. Particularly preferred polyaryl ether sulfones formed from the aforementioned repeat unit are referred to as polysulfone (PSU) (formula Ia).

In a further particularly preferred embodiment, Ar=1,4-phenylene, t=1, q=0, T=Y=$SO_2$. Particularly preferred polyaryl ether sulfones formed from the aforementioned repeat unit are referred to as polyether sulfone (PESU) (formula Ik).

The preferred polyaryl ether sulfones also include polybiphenylsulfone polymers having a reduced content of polymer-bound halogen, especially chlorine, of less than 400 ppm, especially less than 300 ppm, more preferably less than 200 ppm. The lower limit for the content of polymer-bound halogen, preferably chlorine, is typically at least 10 ppm. These polymers are obtainable, for example, under the conditions described in WO 2014/33321.

Abbreviations such as PPSU, PSU and PESU in the context of the present invention conform to DIN EN ISO 1043-1 (Plastics—Symbols and abbreviated terms—Part 1: Basic polymers and their special characteristics (ISO 1043-1:2001); German version EN ISO 1043-1:2002).

The polyaryl ethers preferably have weight-average molecular weights $M_w$ of 10 000 to 150 000 g/mol, especially of 15 000 to 120 000 g/mol, more preferably of 18 000 to 100 000 g/mol, determined by means of gel permeation chromatography in a dimethylacetamide solvent against narrow-distribution polymethylmethacrylate as standard.

The polyaryl ethers preferably have a number-average molecular weight $M_n$, of 10 000 to 35 000 g/mol, determined by means of gel permeation chromatography in a dimethylacetamide solvent against narrow-distribution polymethylmethacrylate as standard.

The polydispersity is preferably from 1.9 to 7.5, more preferably from 2.1 to 4.

In addition, the polyaryl ethers in pure substance preferably have an apparent melt viscosity at 350° C./1150 $s^{-1}$ of 100 to 1000 Pa s, preferably of 150 to 300 Pa s and especially preferably of 150 to 275 Pa s.

The melt viscosity was determined by means of a capillary rheometer. The apparent viscosity was determined at 350° C. as a function of the shear rate in a capillary viscometer (Göttfert Rheograph 2003 capillary viscometer) with a circular capillary of length 30 mm, a radius of 0.5 mm, a nozzle inlet angle of 180°, a diameter of the reservoir vessel for the melt of 12 mm and with a preheating time of 5 minutes. The values reported are those determined at 1150 $s^{-1}$.

The softening temperature $T_S$ of the polyaryl ether is typically in the range from 150 to 230° C., preferably in the range from 155 to 230° C. and especially preferably in the range from 160 to 180° C., determined by means of dynamic differential calorimetry. Processes therefor are known to those skilled in the art.

The softening temperature $T_S$ of the polyaryl ether is understood in the present context to mean the glass transition temperature of the pure polyaryl ether comprising 2% to 30% by weight of the extractant (E), based on the total weight of the polyaryl ether and the extractant (E), where the polyaryl ether does not contain any salt (S).

The softening temperature $T_S$ of the polyaryl ether is preferably understood to mean the glass transition temperature of the pure polyaryl ether comprising at least 15% by weight of the extractant (E), based on the total weight of the polyaryl ether and the extractant (E), where the polyaryl ether does not contain any salt (S).

The softening temperature $T_S$ of the polyaryl ether can therefore be determined analogously to the glass transition temperature $T_G$ of the polyaryl ether.

It will be apparent that the softening temperature $T_S$ of the polyaryl ether is below the glass transition temperature $T_G$ of the polyaryl ether.

The present invention thus further provides a process in which the softening temperature $T_S$ of the polyaryl ether is in the range from 150 to 230° C.

The glass transition temperature $T_G$ of the polyaryl ether is typically in the range from 160 to 270° C., preferably in the range from 170 to 250° C. and especially preferably in the range from 180 to 230° C., determined by differential thermoanalysis (DTA; differential calorimetry, DSC; the exact method of measurement can be found in the examples section).

Methods for determining glass transition temperature $T_G$ by differential thermoanalysis are known as such to those skilled in the art.

The glass transition temperature $T_G$ is understood to mean the temperature at which the polyaryl ether solidifies in the course of cooling to give a glassy solid.

The present invention thus further provides a process in which the glass transition temperature $T_G$ of the polyaryl ether is in the range from 160° C. to 270° C.

The polyaryl ethers of the invention are typically amorphous. "Amorphous" in the context of the present invention means that the polyaryl ethers do not have a melting temperature $T_M$. They have only a glass transition temperature $T_G$. At the glass transition temperature $T_G$, the polyaryl ether changes from the solid state to the molten state.

The present invention therefore also provides a process in which the polyaryl ether is amorphous.

Step II)

In step II), the salt-containing polymer (SP) obtained in step I) is transferred from the mixing kneader into a reactor comprising a dynamic mixer. During the transfer, the salt-containing polymer (SP) is at a second temperature $T_{2-II}$ above the softening temperature $T_S$ of the polyaryl ether. The reactor to which the salt-containing polymer (SP) is transferred comprises an extractant (E) at a third temperature $T_{3-II}$ above the softening temperature $T_S$ of the polyaryl ether.

In step II), the salt-containing polymer (SP) is transferred from the mixing kneader to the reactor. The salt-containing polymer (SP) in step II) can be transferred either directly or indirectly from the mixing kneader to the reactor. The transfer is preferably direct.

If the salt-containing polymer (SP) obtained in step I) is transferred indirectly from the mixing kneader into the reactor, it is possible, for example, to discharge the salt-containing polymer (SP) obtained in step I) from the mixing kneader and to pelletize it, for example, and then to transfer it into the reactor.

As described above, the transfer of the salt-containing polymer (SP) obtained in step I) from the mixing kneader into the reactor is preferably direct, i.e. without intermediate steps.

In order to transfer it directly from the mixing kneader into the reactor, the salt-containing polymer (SP) can be discharged from the mixing kneader by any methods known to those skilled in the art. Preferably, the salt-containing polymer (SP) is transferred in the form of a salt-containing melt by means of a pump through a pipeline into the reactor. Processes for this purpose are known to those skilled in the art.

The salt-containing polymer (SP) discharged is then transferred directly into the reactor. During the transfer, the salt-containing polymer (SP) is at a second temperature $T_{2-II}$ above the softening temperature $T_S$, preferably above the glass transition temperature $T_G$, of the polyaryl ether.

The present invention therefore also provides a process in which the salt-containing polymer (SP) in step II) is at a second temperature $T_{2-II}$ above the glass transition temperature $T_G$.

The details and preferences described below are applicable to the softening temperature $T_S$ and the glass transition temperature $T_G$ of the polyaryl ether.

Preferably, the second temperature $T_{2-II}$ is in the range from 200 to 400° C., more preferably in the range from 250 to 350° C.

The present invention therefore also provides a process in which the second temperature $T_{2-II}$ of the salt-containing polymer (SP) in step II) is in the range from 200 to 400° C.

It will be apparent that it is possible that the salt-containing polymer (SP) is at least partly cooled while it is being transferred from the mixing kneader to the reactor in step II). In this case, there is a change in the second temperature $T_{2-II}$ during the transfer. However, over the entire transfer, it is above the softening temperature $T_S$, preferably above the glass transition temperature $T_G$, of the polyaryl ether.

In a further embodiment of the present invention, the second temperature $T_{2-II}$ possessed by the salt-containing polymer (SP) in step II) is equal to the first temperature $T_{1-I}$ at which components (a1) and (a2) are reacted in step I).

Suitable reactors to which the salt-containing polymer (SP) is transferred are all reactors known to those skilled in the art that comprise a dynamic mixer. The reactor is thus preferably a reactor that works by the rotor/stator principle in the through-flow principle. Reactors of this kind are known per se to those skilled in the art.

It is thought that the dynamic mixer of the reactor distributes the salt-containing polymer (SP) transferred to the reactor to form fine droplets. This additionally increases the surface area of the salt-containing polymer (SP), which further improves the extraction of the salt (S) in step III). The size of the droplets of the salt-containing polymer (SP) is, for example, in the range from 10 to 100 μm.

It is preferable that the reactor comprising the dynamic mixer has a shear rate in the range from 50 to 2000 1/s, preferably in the range from 100 to 1500 1/s, more preferably in the range from 200 to 1000 1/s and most preferably from 300 to 700 1/s.

The shear rate can be calculated via the angular velocity ω and the circumferential velocity by the following formulae:

$$\omega = 2 \cdot \pi \cdot \frac{n}{60}$$
$$v = \omega \cdot r$$
$$\dot{\gamma} = \frac{v}{h}$$

where
ω is the angular velocity in radius/second,
n is the speed in 1/min,
v is the circumferential velocity in m/s,
r is the greatest radius of the dynamic mixer, i.e. of the rotor, in m,
$\dot{\gamma}$ is the shear rate in 1/s and
h is the shear gap, which is understood to mean the smallest gap between the inner wall of the reactor and the dynamic mixer, i.e. the smallest gap between the rotor and the stator, in m.

According to the invention, the reactor comprises an extractant (E).

"An extractant (E)" in the context of the present invention means either exactly one extractant or a mixture of two or more extractants (E). A suitable extractant (E) is in principle any solvent that dissolves the salt (S) present in the salt-containing polymer (SP). Preferably, the extractant (E) comprises a protic solvent. More preferably, the extractant (E) comprises water.

The present invention therefore also provides a process in which the extractant (E) used is a protic solvent.

In general, the extractant (E) comprises at least 50% by weight, preferably at least 70% by weight, especially preferably at least 80% by weight and most preferably at least 90% by weight of water, based in each case on the total weight of the extractant (E). Most preferably, the extractant (E) consists of water.

The present invention therefore also provides a process in which the extractant (E) comprises water.

According to the invention, the extractant (E) is at a third temperature $T_{3-II}$ above the softening temperature $T_S$, preferably above the glass transition temperature $T_G$, of the polyaryl ether.

The present invention therefore also provides a process in which the extractant (E) in step II) is at a third temperature $T_{3-II}$ above the glass transition temperature $T_G$.

Preferably, the third temperature $T_{3-II}$ of the extractant (E) is in the range from 160 to 300° C., more preferably in the range from 200 to 280° C. and especially preferably in the range from 220 to 260° C.

The present invention therefore also provides a process in which the third temperature $T_{3-II}$ of the extractant (E) in step II) is in the range from 160 to 300° C.

It will be apparent that the third temperature $T_{3-II}$ of the extractant (E) is below the decomposition temperature of the polyaryl ether. For example, the third temperature $T_{3-II}$ is at least 1° C., preferably at least 5° C. and especially preferably at least 10° C. below the decomposition temperature of the polyaryl ether.

The third temperature $T_{3-II}$ may be above the second temperature $T_{2-II}$ and/or above the first temperature $T_{1-I}$. It is likewise possible that the third temperature $T_{3-II}$ is below the second temperature $T_{2-II}$ and/or below the first temperature $T_{1-I}$. This embodiment is preferred.

The pressure in the reactor in step II) is, for example, in the range from 6 to 100 bar, preferably in the range from 10 to 70 bar, especially preferably in the range from 20 to 50 bar.

Step III)

In step III), the salt (S) is extracted from the salt-containing polymer (SP) with the extractant (E) in the reactor. The extraction is conducted at a fourth temperature $T_{4-III}$ above the softening temperature $T_S$ of the polyaryl ether. This affords a desalinated polymer (DP). The desalinated polymer (DP) comprises the polyaryl ether. In addition, a salt-containing extractant (SE) comprising the extractant (E) and the salt (S) is obtained.

The salt (S) is extracted from the salt-containing polymer (SP) in step III) at a fourth temperature $T_{4-III}$ above the softening temperature $T_S$, preferably above the glass transition temperature $T_G$, of the polyaryl ether.

The present invention therefore also provides a process in which the salt (S) is extracted from the salt-containing polymer (SP) at a fourth temperature $T_{4-III}$ above the glass transition temperature $T_G$ of the polyaryl ether.

Preferably, the fourth temperature $T_{4-III}$ is in the range from 160 to 300° C., more preferably in the range from 200 to 280° C. and especially preferably in the range from 220 to 260° C.

The present invention therefore also provides a process in which the fourth temperature $T_{4-III}$ in step III) is in the range from 160 to 300° C.

The pressure during the extraction of the salt (S) in step III) is, for example, in the range from 6 to 100 bar, preferably in the range from 10 to 70 bar and especially preferably in the range from 20 to 50 bar.

The fourth temperature $T_{4-III}$ may be above the third temperature $T_{3-II}$ and/or above the second temperature $T_{2-II}$ and/or above the first temperature $T_{1-I}$. It is likewise possible that the fourth temperature $T_{4-III}$ is below the third temperature $T_{3-II}$ and/or below the second temperature $T_{2-II}$ and/or below the first temperature $T_{1-I}$.

The present invention therefore also provides a process in which the first temperature $T_{1-I}$, the second temperature $T_{2-II}$, the third temperature $T_{3-II}$ and the fourth temperature $T_{4-III}$ are above the glass transition temperature $T_G$ of the polyaryl ether.

During the extraction of the salt (S), the salt-containing polymer (SP) is thus present above the softening temperature $T_S$, preferably above the glass transition temperature $T_G$, of the polyaryl ether. Therefore, the salt-containing polymer (SP) is in molten form during the extraction in step III) as well.

The dwell time of the salt-containing polymer (SP) in the reactor comprising a dynamic mixer in step III) may be as desired. For example, the dwell time is in the range from 1 to 100 s (seconds), preferably in the range from 3 to 60 s and more preferably in the range from 5 to 20 s.

The dwell time in the context of the present invention is understood to mean the period of time between the juncture at which the salt-containing polymer (SP) is introduced into the reactor and the juncture at which the desalinated polymer (DP) obtained is withdrawn from the reactor.

In step III), the salt-containing extractant (SE) comprising the extractant (E) and the salt (S) is obtained.

The salt-containing extractant (SE) comprises the portion of the salt (S) which has been removed from the salt-containing polymer (SP). For example, the salt-containing extractant (SE) comprises 0.1% to 20% by weight of the salt (S), preferably 0.5% to 10% by weight of the salt (S) and especially preferably 1% to 5% by weight of the salt (S), based in each case on the total weight of the salt-containing extractant (SE).

In addition, the desalinated polymer (DP) is obtained. The desalinated polymer (DP) can be separated from the salt-containing extractant (SE) by any methods known to those skilled in the art. Preferably, the desalinated polymer (DP) is separated from the salt-containing extractant (SE) by sedimentation. The sedimentation can be effected in the same reactor as the extraction, but it is likewise possible and preferable in accordance with the invention to conduct the sedimentation in a settling vessel. This principle of combined extraction and subsequent sedimentation is also known to the person skilled in the art as the mixer-settler principle. As an alternative to sedimentation, separation can be effected in a centrifugal field by means of centrifuges, decanters or hydrocyclones. Apparatuses for this purpose are known to those skilled in the art.

Steps II and III) may be repeated. In this case, the desalinated polymer (DP) is contacted again with the extractant (E) and extracted. This removes further salt (S) from the desalinated polymer (DP).

If step III) is repeated, it is preferably repeated in the form of a cascade. This means that the desalinated polymer (DP) is separated from the salt-containing extractant (SE) in a settling vessel. The desalinated polymer (GP) is in molten form in the settling vessel and is transferred to a second reactor in this molten form. In this second reactor, further salt (S) is then removed from the desalinated polymer (DP) by extraction with the extractant (E). This second reactor is preferably followed by a second settling vessel in which the desalinated polymer (DP) is separated from the salt-containing extractant (SE) obtained. The second settling vessel may optionally be followed by further reactors and further settling vessels in which further salt (S) is removed from the desalinated polymer (DP).

It will be apparent that the desalinated polymer (DP) which is obtained in step III) comprises less salt (S) than the salt-containing polymer (SP) obtained in step I).

In general, the desalinated polymer (DP) still comprises traces of the salt (S). "Traces of the salt (S)" in the present case are understood to mean a salt content in the desalinated polymer (DP) of not more than 150 ppm by weight, preferably of not more than 100 ppm by weight, especially preferably of not more than 80 ppm by weight and most preferably of not more than 50 ppm by weight of the salt (S), based in each case on the total weight of the desalinated polymer.

In general, the desalinated polymer (DP) comprises in the range from 0.01 to 150 ppm by weight of the salt (S), preferably in the range from 0.1 to 100 ppm by weight, more preferably in the range from 1 to 80 ppm by weight and especially preferably in the range from 5 to 50 ppm by weight of the salt (S), based in each case on the total weight of the desalinated polymer (DP).

Typically, the desalinated polymer (DP) therefore comprises not more than 150 ppm by weight, preferably not more than 100 ppm by weight, especially preferably not more than 80 ppm by weight and most preferably not more than 50 ppm by weight of the salt (S), based in each case on the total weight of the desalinated polymer (DP).

The present invention therefore also provides a process in which the desalinated polymer (DP) obtained in step III) comprises not more than 150 ppm by weight of the salt (S), based on the total weight of the desalinated polymer (DP).

The lower limit of the content of salt (S) in the desalinated polymer (DP) is generally 0.01 ppm by weight, preferably 0.1 ppm by weight, more preferably 1 ppm by weight and especially preferably 5 ppm by weight, based on the total weight of the desalinated polymer (DP).

In an especially preferred embodiment of the present invention, the desalinated polymer (DP) is essentially free of the salt (S). In the context of the present invention, "essentially free" means that the desalinated polymer (DP) comprises not more than 15 ppm by weight, preferably not more than 10 ppm by weight and especially preferably not more than 5 ppm by weight of the salt (S), based on the total weight of the desalinated polymer (DP).

After step III), the desalinated polymer (DP) is typically present in molten form. The desalinated polymer (DP) is then preferably dried and pelletized, for example by means of strand pelletization or underwater pelletization. Subsequently, the desalinated polymer (DP) can be dried for example. Suitable methods for drying are in principle all methods known to those skilled in the art. For example, the desalinated polymer (DP) can be dried at elevated temperatures. Preference is given to temperatures in the range from 150 to 160° C., more preferably in the range from 100 to 150° C. The temperature in the course of drying is typically below the glass transition temperature $T_G$, preferably below the softening temperature $T_S$, of the polyaryl ether. The drying can optionally be conducted under reduced pressure.

Preferably in accordance with the invention, the salt-containing polymer (SP) is prepared in a melt polymerization process. Therefore, the salt-containing polymer (SP) and hence also the desalinated polymer (DP) preferably does not comprise any aprotic polar solvent selected from the group consisting of N,N-dimethylformamide, N,N-dimethylacetamide, N-methylpyrrolidone, N-ethylpyrrolidone, -dimethyl sulfoxide, dimethyl sulfone, sulfolane, diphenyl sulfone and mixtures thereof. More preferably, the desalinated polymer (DP) does not comprise any aprotic polar solvent.

The present invention therefore also provides a desalinated polymer (DP) obtainable by the process of the invention, wherein the desalinated polymer (DP) comprises 0 to 100 ppm by weight, preferably 0 to 20 ppm by weight and especially preferably 0 to 10 ppm by weight of an aprotic polar solvent selected from the group consisting of N,N-dimethylformamide, N,N-dimethylacetamide, N-methylpyrrolidone, N-ethylpyrrolidone, dimethyl sulfoxide, dimethyl sulfone, sulfolane, diphenyl sulfone and mixtures thereof, most preferably no aprotic polar solvent, and comprising less than 150 ppm by weight, preferably less than 100 ppm by weight, more preferably less than 80 ppm by weight and most preferably less than 50 ppm by weight of the salt (S), where the ppm by weight are based in each case on the total weight of the desalinated polymer (DP).

The present invention therefore also provides a desalinated polymer (DP) obtainable by the method of the invention.

The present invention further provides a desalinated polymer (DP) obtainable by the method of the invention, comprising 0 to 100 ppm by weight of an aprotic polar solvent selected from the group consisting of N,N-dimethylformamide, N,N-dimethylacetamide, N-methylpyrrolidone, N-ethylpyrrolidone, dimethyl sulfoxide, dimethyl sulfone, sulfolane, diphenyl sulfone and mixtures thereof, and comprising less than 150 ppm by weight of the salt (S), where the ppm by weight are each based on the total weight of the desalinated polymer (DP).

The desalinated polymers (DP) obtainable by the method of the invention preferably have an apparent melt viscosity at 350° C./1150 $s^{-1}$ of 100 to 1000 Pa s, preferably of 150 to 300 Pa s and especially preferably of 150 to 275 Pa s.

The melt viscosity was determined by means of a capillary rheometer. The apparent viscosity was determined at 350° C. as a function of the shear rate in a capillary viscometer (Göttfert Rheograph 2003 capillary viscometer) with a circular capillary of length 30 mm, a radius of 0.5 mm, a nozzle inlet angle of 180°, a diameter of the reservoir vessel for the melt of 12 mm and with a preheating time of 5 minutes. The values reported are those determined at 1150 $s^{-1}$.

The viscosity numbers of the polymers (DP) desalinated by the method of the invention are generally in the range from 20 to 120 mL/g, preferably from 30 to 100 mL/g and especially preferably from 35 to 95 mL/g, determined by Ubbelohde viscosity number measurement of a 0.01 g/mL solution of the salt-containing polymer (SP) in a 1:1 phenol/1,2-dichlorobenzene mixture in accordance with DIN 51562.

The desalinated polymers (DP) obtainable by the process of the invention are suitable for production of molding compounds, fibers, films, coatings or moldings. The desalinated polymers (DP) are especially suitable for applications in which high purity of the polymeric matrix is desired, for example in the food sector, in the field of membranes or in electronics.

EXAMPLES

Abbreviations
DHDPS dihydroxydiphenyl sulfone
DCDPS dichlorodiphenyl sulfone
NMP N-methyl-2-pyrrolidone
VN viscosity number
Methods of Determination
Softening Temperature $T_S$ The softening temperature was determined by means of DSC. The respective sample was weighed into a crucible that was pressure-tight at 20 bar and heated up twice at 2 K/min. In the third heating run (2 K/min and an underlying modulation of 1 K/80 s), the measurement curve was recorded.

The softening temperature can be determined either on the pure polymer or else as an approximation on the salt-containing polymer SP by contacting 10 g of SP with 1 L of water at 95° C. for 24 h. This reduces the salt content in the salt-containing polymer to about 1% salt. After the liquid phase consisting of water and dissolved salt has been removed, there is between 20% and 30% water, about 1% salt and the remaining (69% to 79%) polyaryl ether in the granular material after this treatment. In this water- and salt-laden state, it is possible to conduct a DSC measurement by means of the abovementioned method in order to obtain an approximation of the softening temperature. It is then possible to ascertain two temperatures from the DSC measurement curve that represent a transition from the vitreous state to the liquid state. Of these temperatures, the lower temperature is the softening temperature and the higher temperature the glass transition temperature. With increasing size of the interface of the polymer, the signal for the softening point becomes clearer. For this reason, the softening temperature is preferably determined by first comminuting the salt-containing or pure polymer until a powder having a particle size of 50 µm is obtained and then contacting it with water by the method given above, removing the surface water and conducting the DSC measurement on the moist, water-laden polymer.

In the case of very large interfaces, as in the case of the dispersed polymer in water, the second signal disappears entirely and the behavior of the polymer over and above the softening temperature is like a liquid.

Viscosity Number

The VN was determined by Ubbelohde viscosity number measurement of a 0.01 g/mL solution of the salt-containing polymer (SP) in a 1:1 phenol/1,2-dichlorobenzene mixture in accordance with DIN 51562-1:1999-01.

Salt Content

Chlorine in ionic form was determined by means of titration. The chlorine content thus determined was used to ascertain the potassium chloride concentration.

About 100 to 500 mg of a polymer sample were weighed into a beaker and dissolved with NMP. Thereafter, the sample was diluted with acetic acid/acetone (1:1). For the titration, methyl orange was added to this sample solution and it was acidified with sulfuric acid or nitric acid. This was followed by potentiometric titration with a silver nitrate solution (0.001 mol/L). The consumption of the standard solution was not less than 1 mL.

Experiment 1 (according to the invention)

The DHDPS and DCDPS monomers were polymerized in the presence of potassium carbonate in the molar ratios of DHDPS:DCDPS 1:1.005 and DHDPS:potassium carbonate 1:1.06. The polymerization was effected in the absence of a solvent in a mixing kneader at a first temperature $T_{1-I}$ of 290° C.

The salt-containing polymer (SP1) thus obtained had a VN=52 mL/g and comprised 24.3% (243 000 ppm) potassium chloride.

Thereafter, the salt-containing polymer SP1 was pelletized and cooled.

For conveying, SP1 was melted again, brought to a temperature $T_{2-II}$ of 310° C. and metered at this temperature into a reactor comprising a dynamic mixer. The dynamic mixer comprised water at a temperature $T_{3-II}$ of 240° C. A suspension was obtained, which separated into two phases. The salt was extracted at a temperature $T_{4-II}$ of 241° C. The speed of the dynamic mixer was 157 rpm. The dwell time in the reactor was 47 seconds.

The extraction was conducted a total of three times as described above. In the second and third extractions, however, the speed was reduced to 130 rpm while the dwell time was kept constant. The potassium chloride content was 5200 ppm after the first extraction, 148 ppm after the second extraction and <20 ppm after the third extraction.

The softening temperature of the desalinated polymer (DP1) was 166° C.

Experiment 2 (according to the invention)

The DHDPS and DCDPS monomers were polymerized in the presence of potassium carbonate in the molar ratios of DHDPS:DCDPS 1:1.005 and DHDPS:potassium carbonate 1:1.06. The polymerization was effected in the absence of a solvent in a mixing kneader at a first temperature $T_{1-I}$ of 290° C.

The salt-containing polymer (SP1) thus obtained had a VN=47 mL/g and comprised 24.3% (243 000 ppm) potassium chloride.

Thereafter, the salt-containing polymer SP1 was pelletized and cooled.

For conveying, SP1 was melted again, brought to a temperature $T_{2-II}$ of 310° C. and metered at this temperature into a reactor comprising a dynamic mixer. The dynamic mixer comprised water at a temperature $T_{3-II}$ of 230° C. A suspension was obtained, which separated into two phases. The salt was extracted at a temperature $T_{4-II}$ of 240° C. The speed of the dynamic mixer was 157 rpm. The dwell time in the reactor was 47 seconds.

The extraction was conducted a total of three times as described above. The potassium chloride content was 7930 ppm after the first extraction, 370 ppm after the second extraction and 48 ppm after the third extraction.

The softening temperature of the desalinated polymer (DP1) was 166° C.

The invention claimed is:

1. A process for preparing a polyaryl ether having a softening temperature $T_S$, comprising the steps of
    I) reacting the components
        (a1) at least one aromatic dihydroxyl compound and
        (a2) at least one aromatic sulfone compound having, two halogen substituents
        in the presence of a carbonate compound (C) at a first temperature $T_{1-I}$ above the softening temperature $T_S$ of the polyaryl ether in a mixing kneader to obtain a salt-containing polymer (SP) comprising the polyaryl ether and a salt (S),
    II) transferring the salt-containing polymer (SP) obtained in step I) from the mixing kneader into a reactor comprising a dynamic mixer, where the salt-containing polymer (SP) has a second temperature $T_{2-II}$ above the softening temperature TS of the polyaryl ether, and where the reactor comprises an extractant (E) having a third temperature $T_{3-II}$ above the softening Temperature $T_S$ of the polyaryl ether,
    III) extracting the salt (S) from the salt-containing polymer (SP) with the extractant (E) in the reactor comprising a dynamic mixer at a fourth temperature $T_{4-III}$ above the softening temperature $T_S$ of the polyaryl ether to obtain a desalinated polymer (DP) comprising the polyaryl ether and a salt-containing extractant (SE) comprising the extractant (E) and the salt (S).

2. The process according to claim 1, wherein the fourth temperature $T_{4-III}$ in step III) is in the range from 160 to 300° C.

3. The process according to claim 1, wherein the third temperature $T_{3-II}$ of the extractant (E) in step II) is in the range from 160 to 300° C.

4. The process according to claim 1, wherein the second temperature $T_{2-II}$ of the salt-containing polymer (SP) in step II) is in the range from 200 to 400° C.

5. The process according to claim 1, wherein the first temperature $T_{1-I}$ in step I) is in the range from 200 to 400° C.

6. The process according to claim 1, wherein the softening temperature $T_S$ of the polyaryl ether is in the range from 150 to 230° C.

7. The process according to claim 1, wherein the extractant (E) comprises water.

8. The process according to claim 1, wherein the desalinated polymer (DP) obtained in step III) comprises not more than 150 ppm by weight of the salt (S), based on the total weight of the desalinated polymer (DP).

9. The process according to claim 1, wherein the polyaryl ether is amorphous.

10. The process according to claim 1, wherein component (a1) is selected from the group consisting of 4,4'-dihydroxybiphenyl, 2,2-bis(4-hydroxyphenyl)propane and bis(4-hydroxyphenyl) sulfone.

11. The process according to claim 1, wherein component (a2) is selected from the group consisting of 4,4'-dichlorodiphenyl sulfone, 4,4'-difluorodiphenyl sulfone, 4,4'-dibromodiphenyl sulfone, 2,2'-dichlorodiphenyl sulfone and 2,2'-difluorodiphenyl sulfone.

12. The process according to claim 1, wherein the polyaryl ether is a polyaryl ether sulfone.

13. The process according to claim 1, wherein the salt (S) comprises potassium chloride and/or sodium chloride.

14. A desalinated polymer (DP) obtained by the method according to claim 1, wherein the desalinated polymer (DP) comprises 0 to 100 ppm by weight of an aprotic polar solvent selected from the group consisting of N,N-dimethylformamide, N,N-dimethylacetamide, N-methylpyrrolidone, N-ethylpyrrolidone, dimethyl sulfoxide, di methyl sulfone, sulfolane, diphenyl sulfone and mixtures thereof, and less than 150 ppm by weight of the salt (S), where the ppm by weight are each based on the total weight of the desalinated polymer (DP).

15. The desalinated polymer (DP) according to claim 14, wherein the polyaryl ether is polysulfone (PSU), polyphenylene sulfone (PPSU) or polyether sulfone (PESU).

16. A fiber, film, coating or molding comprising or produced using the desalinated polymer (DP) according to claim 14.

* * * * *